United States Patent [19]

Sudhaker et al.

[11] Patent Number: 5,576,261
[45] Date of Patent: Nov. 19, 1996

[54] HYDRODEAROMATIZATION CATALYST COMPOSITION

[75] Inventors: Chakka Sudhaker, Wappingers Falls; Frank Dolfinger, Jr., Poughkeepsie; Max R. Cesar, Newburgh, all of N.Y.

[73] Assignee: Texaco Inc., White Plains, N.Y.

[21] Appl. No.: 279,362

[22] Filed: Jul. 22, 1994

Related U.S. Application Data

[63] Continuation of Ser. No. 990,381, Dec. 14, 1992, abandoned.

[51] Int. Cl.$^6$ .......................... B01J 23/24; B01J 27/049; B01J 27; B01J /051
[52] U.S. Cl. .......................... 502/185; 502/219; 502/220; 502/221
[58] Field of Search .................................. 502/313, 185, 502/220, 219, 221

[56] References Cited

U.S. PATENT DOCUMENTS 3,365,511  1/1968  Kovach .................................. 208/255
4,518,488  5/1985  Wennerberg .......................... 208/216 R
4,748,142  5/1988  Chiamells et al. ...................... 502/220
4,824,820  4/1989  Jacobson et al. ...................... 502/219
4,831,003  5/1989  Lang et al. ............................. 502/182

OTHER PUBLICATIONS

"Solid Supports and Catalysts in Organz Synthesis", Editor K. Smith Ellis Horwood, PTR Prentice 4–11, 1992, p. 16.

"Alcoa Activated Aluminas", Alumina Company of America, p. 4.

Primary Examiner—Asok Pal
Assistant Examiner—Patrick J. Neill
Attorney, Agent, or Firm—K. R. Priem; J. L. Bailey; C. L. Hunter

[57] ABSTRACT

A naphtha or a middle distillate hydrocarbon is hydrodearomatized by hydrotreating in the presence of a catalyst containing a carbon support bearing (i) molybdenum or tungsten, (ii) a metal or non-noble Group VIII, and (iii) chromium.

4 Claims, No Drawings

HYDRODEAROMATIZATION CATALYST COMPOSITION

CROSS REFERENCE

This application is a continuation of U.S. patent application Ser. No. 07/990,381, filed Dec. 14, 1992, abandoned.

FIELD OF THE INVENTION

This invention relates to a process for hydrodearomatizing naphthas or middle distillate hydrocarbons. More particularly it relates to a process for treating a hydrocarbon diesel oil to convert aromatic hydrocarbon components to non-aromatic hydrocarbon components and to novel carbon supported catalyst.

BACKGROUND OF THE INVENTION

As is well known to those skilled in the art, aromatic hydrocarbons in middle distillate fuels such as gasoline or diesel oil represent a source of atmospheric pollution. The aromatic content of those middle distillates may be as high as 85 v %. An illustrative light straight run gas oil may for example be typically found to contain 30 v % aromatics. As environmental considerations become of greater concern, it is desirable to treat middle distillate hydrocarbons to decrease the content of undesirable aromatic components.

U.S. Pat. No. 3,997,473 (and its divisional U.S. Pat. No. 4,032,435) is directed to hydrodesulfurization of petroleum residues by use of a cobalt/nickel with molybdenum or tungsten on carbon catalyst which is characterized by an average pore radius of at least 25 Å and a BET Surface area of 200–800 $m^2/g$. The catalyst of these patents has a loading of VI-B metal "of at least 10 and up to about 20 weight percent expressed as metal oxide based on the weight of the catalyst support."

U.S. Pat. No. 4,082,652 is directed to treatment of heavy oils, such as gas oils, to effect hydrodesulfurization by use of a molybdenum/nickel on carbon catalyst. The catalyst preparation requires that the molybdenum be deposited first then sulfided, and only then that the nickel be added.

U.S. Pat. No. 3,546,103 is directed to the removal of metals and coke from hydrocarbon resids by use of, as precatalyst, metals of Group II-B or VI-B plus VIII on charcoal.

U.S. Pat. No. 3,367,862 is directed to desulfurization of heavy residual hydrocarbons by hydrolysis with water in the presence of catalyst on a char base.

U.S. Pat. No. 3,812,028 is directed specifically to "hydrotreating" fossil fuels containing polynuclear aromatics such as asphaltenes for converting the components boiling above 1000° F. to products boiling below 1000° F. (this is actually hydrocracking), by the use of Group VI and/or Group VIII metals on carbon, at a hydrogen partial pressure in excess of 2200 psig and at temperatures between 750° F. and 850° F.

U.S. Pat. No. 4,313,852 is directed to hydrotreating, particularly of coal liquids, in the presence of carbon supported molybdenum or tungsten sulfide catalysts with or without a second metallic component, in which catalysts the metal sulfides are substantially completely exist on the outer surface of the active carbon support. The carbon supported catalyst preparation according to U.S. Pat. No. 4,313,852 must involve direct deposition of metal sulfides on the carbon support and subsequent reduction of them to lower valent sulfides.

U.S. Pat. No. 5,051,389 is directed to a method for preparing a catalyst composition for hydroconversion processes wherein the catalyst composition is formed by depositing one or more metal and/or metal compounds onto a preformed carbon support which has maximum dimension in any direction from about 50 Angstroms to about 500 Angstroms, from the vapor phase at elevated temperatures. The catalysts made according to U.S. Pat. No. 5,051,389 have to be added to or combined with the carbonaceous material to be hydrotreated in only 50 ppm to 5000 ppm concentration for the hydroconversion process to take place (one-pass application).

U.S. Pat. No. 3,725,303 is directed to treating of aqueous solutions of oxy-sulfur compounds (such as sodium thiosulfate) by use of a catalyst containing molybdenum sulfide and cobalt sulfide on carbon support.

It is an object of this invention to provide a novel process and catalyst for hydrodearomatizing middle distillate hydrocarbons. Other objects will be apparent to those skilled in the art.

STATEMENT OF THE INVENTION

In accordance with certain of its aspects, this invention is directed to a process for treating a charge naphtha or middle distillate hydrocarbon containing undesired aromatic components which comprises maintaining a bed of sulfided carbon-supported catalyst containing (i) molybdenum or tungsten, (ii) a metal of non-noble Group VIII, and (iii) chromium;

passing a charge hydrocarbon in the presence of hydrogen into contact with said sulfided catalyst containing (i) molybdenum or tungsten, (ii) a metal of non-noble Group VIII and (iii) chromium on a carbon support at hydrotreating conditions thereby effecting hydrodearomatization of said charge hydrocarbon containing undesired aromatic components and forming a product stream of hydrocarbon containing a lesser quantity of undesired aromatic components; and recovering said product stream of hydrocarbon containing a lesser quantity of undesired aromatic components.

DESCRIPTION OF THE INVENTION

The charge hydrocarbons which may be treated by the process of this invention may be those which are commonly designated as naphthas or middle distillates. Typically naphthas may have an ibp of at least about 70° F. and typically 80° F.–200° F. The charge middle distillates may have an initial boiling point (ibp) by ASTM #D96 of at least about 300° F., and commonly about 300° F.–480° F.

These charge hydrocarbons may include light and full range naphtha (ibp of 70° F.–120° F.), heavy naphtha (ibp of 120° F.–200° F.), kerosene (ibp of 300° F.–340° F.), light gas oil (ibp of 360° F.–480° F.), etc.

Many of these charge middle distillates may have an aromatics content as high as 80 v %, typically 20 v %–80 v %, say 25 v %–75 v %. In addition to the undesired aromatics content, they may contain other undesirables such as sulfur (0.1 w %–5 w %, typically 1 w %–4 w %) and nitrogen (10–5000 wppm, typically 0.001%–0.2 w %).

A typical charge which may be treated by the process of this invention may be a light atmospheric gas oil (LAGO) having the following properties:

TABLE

| Property | Value |
| --- | --- |
| API Gravity | 32 |
| ibp °F. | 386 |
| 10% bp °F. | 506 |
| 50% bp °F. | 571 |
| 90% bp °F. | 651 |
| ep °F. | 680 |
| S w % | 0.71 |
| N wppm | 490 |
| Aromatics w % (SFC) | 31 |

In practice of the process of this invention, the charge may be admitted to a catalyst bed at about 570° F.–850° F., preferably 570° F.–770° F., say about 716° F. and 400–3000 psig, preferably 600–3000 psig, say 1500 psig. Hydrogen is admitted at a flow rate of 1000–10,000 SCFB, preferably 2000–8,000 SCFB, say about 4000 SCFB. LHSV based on catalyst volume may be 0.1–5, preferably 0.5–4, say about 1.

The supported catalyst of this invention is prepared on an activated carbon support. Although it may be possible to utilize powdered carbon in a fluidized bed, it is preferred to utilize extrudates in a packed bed. The support may be in the form of granules, pellets, or extrudates of carbon plus a refractory inorganic support. The surface area (Brunauer-Emmett-Teller BET) of the carbon support is at least about 200 m$^2$/g. The Total Pore Volume (TPV) for nitrogen is at least about 0.4 cc/g, preferably 0.4–1.2 cc/g, say 0.8 cc/g. The Pore Diameter (average), by nitrogen physisorption is at least 16 Å, preferably 16 Å–50 Å, say 20 Å.

Illustrative commercially available carbon pellets, granules, or extrudates which may be used as catalyst supports used in fixed beds in practice of the process of this invention may include:

TABLE

A. The Norit RX carbon (of the Norit Company) acid-washed extrudate (3 mm diameter) having a surface area (BET) of 1424 m$^2$/g, a TPV of 0.8 cc/g (for nitrogen), Average Pore Diameter of 22.4 Å, an apparent bulk density of 410 g/l, and ash content of less than 4%.

B. The Norit R carbon (of the Norit Company) extrudate (3 mm diameter) having a surface area (BET) of 1217 m$^2$/g, a TPV of 0.67 cc/g (for nitrogen), Average Pore Diameter 22 Å, and an apparent bulk density of 410 g/l.

C. The Calgon WS-IV carbon (of the Calgon Company) extrudate (3.2 mm diameter) having a surface area (BET) of 1675 m$^2$/g, a TPV of 0.83 cc/g (for nitrogen), Average Pore Diameter 20 Å, apparent bulk density of 400 g/l, and ash content of less than 8%.

D. The Norit RX carbon (of the Norit Company) acid-washed extrudate (0.8 mm diameter) having a surface area (BET) of 1600 m$^2$/g, a TPV of 0.82 cc/g (for nitrogen), Average Pore Diameter of 20 Å, an apparent bulk density of 410 g/l, and ash content of less than 4%.

It is a particular feature of the process of this invention that the desired dearomatization of naphtha or middle distillate hydrocarbons is attained by use of a catalyst prepared from a carbon (whether as finely divided powder or as a granule) which is particularly characterized by a BET surface area of at least about 200 m$^2$/g, by a Total Pore Volume of at least about 0.4 cc/g, and by an average Pore Diameter of 16 Å–50 Å which carbon has been loaded with (i) 1–40 w % of tungsten or molybdenum and, (ii) 0.1–15 w % of nickel or cobalt and (iii) 0.2–15 w % chromium.

The catalytic metals may be deposited on the carbon, either sequentially or simultaneously, by various processes including incipient wetness impregnation, equilibrium adsorption, etc. from aqueous or non-aqueous media.

The tungsten or molybdenum may preferably be present on the final catalyst in amount of 1–40 w %, preferably 8–35 w %, say 28 w % for W and 1–20 w %, preferably 5–15 w %, say 12 w % for Mo. Both tungsten and molybdenum may be employed.

The cobalt or nickel, preferably nickel, may be present on the final catalyst in amount of 0.1–15 w %, preferably 3–12 w %, say 6 w %. Both cobalt and nickel may be employed.

The chromium may be present in the final catalyst in amount of 0.2–15 w %, preferably 1–10% say 3 w %.

The molybdenum or tungsten may be loaded onto the catalyst support preferably from aqueous solutions respectively of ammonium heptamolybdate or of ammonium metatungstate. The nickel or cobalt metal may be loaded onto the catalyst support from preferably aqueous solution of nickel nitrate hexahydrate or cobalt nitrate hexahydrate.

It is preferred to deposit the molybdenum or tungsten first and thereafter the cobalt or nickel metal with a drying step in between.

The chromium may be loaded onto the catalyst support preferably from an aqueous solution of chromium nitrate 0.9H$_2$O. Chromium is preferably added after the other metals have been added or with the cobalt or nickel although it can be added to the catalyst support at any stage of catalyst preparation.

In a preferred embodiment, 100 parts of carbon support is contacted with an aqueous solution of a salt of molybdenum or tungsten e.g. ammonium heptamolybdate in amount to fill the pores to incipient wetness. The support bearing the metals may be dried at 20°–150° C., say 115° C. for 16–24 hours, say 20 hours, optionally followed by calcination in air or inert atmosphere at 250°–450° C., say 300° C. for 2–6 hours, say 3 hours.

Thereafter the support bearing molybdenum or tungsten is contacted with aqueous solution of the non-noble Group VIII metals e.g. nickel nitrate hexahydrate in amount to fill the pores to incipient wetness. The support bearing the metals is dried at 20°–150° C., say 115° C. for 16–24 hours, say 20 hours, optionally followed by calcination at 250° C.–450° C., say 300° C. for 2–6 hours, say 3 hours.

The so-loaded support is then contacted with an aqueous solution of a chromium compound, typified by chromium nitrate 0.9H$_2$O, dried at 20°–150° C., say 115° C. for 16–24 hours, say 20 hours, optionally followed by calcination at 250° C.–450° C., say 300° C. for 2–6 hours, say 3 hours.

The catalyst so prepared contains 1–40 w %, preferably 8–35 w %, say 12 w % of molybdenum or 28 w % of tungsten (measured as metal) and 0.1–15 w %, say 8 w % of non-noble Group VIII metal (measured as metal) and 0.2–15 w %, say 3 w % of chromium. The metals may exist in the final catalyst composition as metals, metal oxides, oxide-precursors, or as partially decomposed compounds.

The catalyst, bearing molybdenum and/or tungsten, chromium, and non-noble Group VIII metals, is sulfided, preferably after loading into the fixed bed dearomatization reactor. Sulfiding may typically be effected by passing hydrogen sulfide, carbon disulfide, dimethyl sulfide, etc. through the bed (preferably in the presence of hydrogen) at 200° C.–450° C., say 350° C. (i.e. 392° F.–842° F., say 662°

F.) and 0–1000 psig, say 0 psig for 2–24 hours, say 3 hours. Alternatively sulfiding may be carried out prior to loading the catalyst into the reactor. When the hydrocarbon to be treated by the process of this invention contains sulfur (typically in amount of about 1 w % or more) it may not be necessary to presulfide the catalyst prior to use.

Practice of the process of this invention may be carried out by passing the charge naphtha or middle distillate hydrocarbon into contact with the catalyst at 570° F.–850° F., say 716° F. and 400–3000 psig, say 1500 psig, at LHSV (based on catalyst) of 0.1–5, say 1, with hydrogen flow rates of 1,000–10,000, say 4000 SCFB.

During hydrodearomatization, it is found that the aromatic content may be decreased from a charge content of 25–40 w %, say 30 w % down to a product content of 5–15 w %, say 10 w %. In the case for example of a light atmospheric gas oil (LAGO) containing 30 w% aromatics, this content may be reduced to <10 w % in a typical operation.

Practice of the process of this invention will be apparent to those skilled in the art from the following wherein all parts are parts by weight unless otherwise stated. An asterisk (*) indicates a control example.

In each of the Examples, the activated carbon used as the catalyst support was the RX brand of 0.8 mm diameter activated carbon of the Norit Company (D in Table supra) having a Brunauer-Emmett-Teller (BET) surface area of 1600 $m^2/g$, a nitrogen pore volume of 0.82 cc/g, and an average pore diameter of 20 Å measured from nitrogen physisorption data.

EXAMPLE I

In this Example, 37.5 parts of ammonium metatungstate (AMT) $(NH_4)_6H_2W_{12}O_{40}$ is dissolved in 45 parts of fresh deionized water. Carbon support (58 parts) is impregnated with this solution to incipient wetness; and the impregnated material is left to stand at room temperature with occasional stirring for 2 hours. It is then heated slowly at a rate of 0.3° C./min to 115° C. in an oven in air, left at that temperature for 24 hours, and cooled slowly to room temperature over 3 hours.

Half of the cooled material so obtained are impregnated to incipient wetness with a solution of 12.4 parts of nickel (II) nitrate hexahydrate and 9.9 parts of chromium (III) nitrate $0.9H_2O$ in 13 parts of deionized water. The so impregnated material is left to stand at room temperature with occasional stirring for 2 hours. It is then heated slowly at a rate of 0.3° C./min to 115° C. in an oven in air, left at room temperature for 24 hours, and cooled slowly to room temperature over 3 hours.

The resulting catalyst contains 28 w % tungsten, 5 w % nickel, and 3 w % chromium on carbon support.

EXAMPLE II

Ammonium heptamolybdate $0.4H_2O$ (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

One third of the cooled material so obtained is impregnated to incipient wetness with a solution of 9 parts of nickel (II) nitrate hexahydrate and 7.5 parts of chromium (III) nitrate $0.9H_2O$ in 13 parts of deionized water; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 12 w % molybdenum, 5 w % nickel, and 3 w % chromium on carbon support.

EXAMPLE III

Ammonium heptamolybdate $0.4H_2O$ (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Nickel (II) nitrate hexahydrate (27 parts) is dissolved in 46 parts of deionized water; and the above material is impregnated to incipient wetness therewith. The impregnated material is left to stand at room temperature with occasional stirring for 2 hours. It is then heated slowly at a rate of 0.3° C./min to 115° C. in air in an oven, left at that temperature for 24 hours, and cooled slowly to room temperature at room temperature.

One third of the cooled material so obtained is impregnated to incipient wetness with a solution of 7.5 parts of chromium (III) nitrate $0.9H_2O$ in 14 parts of deionized water. The so-impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 12 w % molybdenum, 5 w % nickel, and 3 w % chromium on carbon support.

EXAMPLE IV

In this Example, the procedure of Example III is duplicated.

EXAMPLE V

Ammonium metatungstate $(NH_4)_6H_2W_{12}O_{40}$ (112.5 parts) is dissolved in 120 parts of fresh deionized water. Carbon support (165 parts) is impregnated with the solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

One fifth of the cooled material so obtained is impregnated to incipient wetness with a solution of 17.8 parts of nickel (II) nitrate hexahydrate and 13.9 parts of chromium (III) nitrate $0.9H_2O$ in 16 parts of deionized water; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 28 w % tungsten, 6 w % nickel, and 3 w % chromium on carbon support.

EXAMPLE VI*

In this control Example, ammonium heptamolybdate 0.4H$_2$O (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The cooled material so obtained is impregnated with a solution of 44.1 parts of nickel (II) nitrate hexahydrate in 30 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 12 w % molybdenum and 8 w % nickel on carbon support.

EXAMPLE VII*

In this control Example, ammonium heptamolybdate 0.4H$_2$O (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Forty percent of the cooled material so obtained is impregnated with a solution of 18 parts of nickel (II) nitrate hexahydrate in 30.5 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 5 w % nickel and 12 w % molybdenum on carbon support.

EXAMPLE VIII*

In this control Example, ammonium metatungstate (NH$_4$)$_6$H$_2$W$_{12}$O$_{40}$ (112.5 parts) is dissolved in 120 parts of fresh deionized water. Carbon support (165 parts) is impregnated with the solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Forty percent of the cooled material so obtained is impregnated with a solution of 47.6 parts of nickel (II) nitrate hexahydrate in 32 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 8 w % nickel and 28 w % tungsten on carbon support.

EXAMPLE IX*

In this control Example, ammonium metatungstate (NH$_4$)$_6$H$_2$W$_{12}$O$_{40}$ (37.5 parts) is dissolved in 45 parts of fresh deionized water. Carbon support (58 parts) is impregnated with the solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Half of the cooled material so obtained is impregnated with a solution of 12.4 parts of nickel (II) nitrate hexahydrate in 17 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 5 w % nickel and 28 w % tungsten on carbon support.

EXAMPLE X*

In this control Example, ammonium heptamolybdate 0.4H$_2$O (12 parts) is dissolved in 29 parts of fresh deionized water. Carbon support (40 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The cooled material so obtained is impregnated with a solution of 16.1 parts of cobalt nitrate hexahydrate in 22 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 6 w % cobalt and 12 w % molybdenum on carbon support.

EXAMPLE XI

In this Example, ammonium heptamolybdate 0.4H$_2$O (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

One third of cooled material so obtained is impregnated with a solution of 7.5 parts of chromium (III) nitrate 0.9H$_2$O and 9.2 parts of cobalt nitrate hexahydrate in 11.3 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 5 w % cobalt, 3 w % chromium, and 12 w % molybdenum on carbon support.

EXAMPLE XII*

In this control Example, nickel (II) nitrate hexahydrate (8.6 parts) and chromium (III) nitrate 0.9H$_2$O (13 parts) are dissolved in 10 parts of fresh deionized water. Carbon support (30 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 5 w % nickel and 6 w % chromium on a carbon support.

TABLE

Supercritical Fluid Chromatography (SFC) ASTM # D-5186 and by Open Column Liquid Chromatography (OCLC) ASTM # D-2549.

The particular reaction conditions (380° C./1500 psig, LHSV=1, and $H_2$ flow of 4000 SCFB) employed in the Examples are chosen in such a way that only partial hydrodearomatization (HDAr) occurs and thus permits one to compare the activities of different catalysts at identical reaction conditions.

TABLE

| Example | Catalyst of Example | Catalyst (On Carbon) | % HDS | % HDN | % HDAr (SFC) | % HDAr (OCLC) |
|---|---|---|---|---|---|---|
| XIII | I | Cr—Ni—W | 99.4 | 99.4 | 69.5 | — |
| XIV | II | Cr—Ni—Mo | 99.9 | 99.8 | 56.9 | 60.9 |
| XV | III | Cr—Ni—Mo | 99.8 | 99.6 | — | 49.7 |
| XVI | IV | Cr—Ni—Mo | 98.3 | 100 | 54.5 | — |
| XVII | V | Cr—Ni—W | 99.9 | 99.8 | 69.3 | 66.3 |
| XVIII* | VI* | Ni—Mo | 99.9 | 99.8 | 50.3 | 52.0 |
| XIX* | VII* | Ni—Mo | — | 100 | 51.6 | — |
| XX* | VIII* | Ni—W | 99.9 | 100 | 68.4 | 68.6 |
| XXI* | IX* | Ni—W | 98.7 | 99.8 | 64.3 | — |
| XXII* | X* | Co—Mo | 99.9 | 99.2 | 29.8 | — |
| XXIII | XI | Cr—Co—Mo | 99.1 | 100 | 48.5 | — |
| XXIV* | XII* | Cr—Ni | 96.6 | 96.5 | 18.7 | — |

| Example | Catalyst of Example | Catalyst (on Carbon) | w % Mo/W | w % Ni/Co | w % Cr |
|---|---|---|---|---|---|
| XIII | I | Cr—Ni—W | 28 | 5 | 3 |
| XIV | II | Cr—Ni—Mo | 12 | 5 | 3 |
| XV | III | Cr—Ni—Mo | 12 | 5 | 3 |
| XVI | IV | Cr—Ni—Mo | 12 | 5 | 3 |
| XVII | V | Cr—Ni—W | 28 | 6 | 3 |
| XVIII* | VI* | Ni—Mo | 12 | 8 | 0 |
| XIX* | VII* | Ni—Mo | 12 | 5 | 0 |
| XX* | VIII* | Ni—W | 28 | 8 | 0 |
| XXI* | IX* | Ni—W | 28 | 5 | 0 |
| XXII* | X* | Co—Mo | 12 | 6 | 0 |
| XXIII | XI | Cr—Co—Mo | 12 | 5 | 3 |
| XXIV* | XII* | Cr—Ni | 0 | 5 | 6 |

EXAMPLES XIII–XXIV

Each of the catalysts of Example I–XII was loaded into a hydrotreating reactor. Sulfiding is effected by passing hydrogen containing 10 v % of hydrogen sulfide through the catalyst bed at 25° C. and 1 atm for 15 minutes. The temperature of the reactor is increased by 3° C./minute to 350° C. and maintained at that sulfiding temperature for 2 hours. The temperature is then adjusted to reactor temperature (with the sulfiding gas still flowing). A back pressure of about 100 psig is applied to the reactor and the liquid feed is admitted at the desired rate. Once the liquid has passed beyond the catalyst bed, the flow of sulfiding gas is stopped, and the reactor pressure is increased to desired value. The actual hydrotreating run is considered to start at this point.

The liquid feed in all of the Examples is the light atmospheric gas oil (LAGO) having the properties tabulated supra.

The sulfur content of the feed and several product streams is determined by X-ray fluorescence (XRF) ASTM # D-2622. Nitrogen content is determined by Chemiluminescence Technique. The weight % Aromatics is determined by From the above Table, the following conclusions can be drawn:

(i) It is apparent that the chromium-doped Ni-Mo/carbon, Co-Mo/Carbon and Ni-W/Carbon catalysts of the present invention (e.g. Examples XIII–XVII and XXIII) are more active hydrodearomatization catalysts than are those which do not contain chromium (e.g. Examples XVIII*–XXII*).

(ii) The improvement in the hydrodearomatization activity seems to be very significant for the Co-Mo/Carbon (e.g. Examples XXII*–XXIII) and is less for the Ni-W/Carbon (e.g. Examples XIII, XVII, and XX*–XXI*).

(iii) The order of addition of metals with respect to the deposition of Cr seems to be somewhat important for improved hydrodearomatization activity. Examples XV and XVI wherein the catalysts are made by sequential impregnation with Cr added last, are not as active as Example XIV wherein the catalyst is prepared by depositing Cr and Ni together.

(iv) Under the reaction conditions employed for effecting partial hydrodearomatization, the sulfur removal (HDS) and nitrogen removal (HDN) are essentially complete (close to 100%) in all cases (Examples XIII–XXIII) except in Example XXIV* which employed a catalyst without any molybdenum or tungsten.

(v) The carbon supported Cr-Ni catalyst XII* in Example XXIV* (which contains 6 w % chromium) is much less active not only for hydrodearomatization, but also for HDS and HDN compared to all the other catalysts. This observation indicates that the promotion of the hydrodearomatization activity of carbon supported catalysts by chromium is possible only if the chromium is present in the catalyst along with Mo and/or W.

Carbon supported chromium (no other metals present) catalyst is found to have very low HDS and HDN activities for the same LAGO feed in our observations. This is probably because substantial sulfiding of chromium is not possible under the same conditions employed to effect almost complete sulfiding of molybdenum or tungsten.

It is possible to say from our observations that the chromium enhances the hydrogenation activity of the carbon supported catalysts if it is present along with molybdenum and/or tungsten and non-noble Group VIII metals on the carbon support.

Although this invention has been illustrated by reference to specific embodiments, it will be apparent to those skilled in the art that various changes and modifications may be made which clearly fall within the scope of the invention.

What is claimed:

1. A catalyst characterized by its ability, when sulfided, to hydrodearomatize an essentially asphaltene free hydrocarbon feedstock in the presence of hydrogen while simultaneously effecting hydrodesulfurization and hydrodenitrogenation of the hydrocarbon feedstock which comprises a carbon support bearing (i) 1–40 wt % of at least one of tungsten or molybdenum, and
   (ii) 0.1–15 wt % of nickel or cobalt or iron, and
   (iii) 0.2–10 wt % of chromium, based on the total catalyst weight,
   (iv) wherein the carbon support has a B.E.T. surface area of at least 800 $m^2/g$, a total pore volume for nitrogen of at least 0.4 cc/g, and average pore diameter by nitrogen adsorption, defined as $$\text{Average Pore Diameter (Angstroms)} = \frac{40,000 \times \text{Pore Volume for nitrogen in cc/g}}{\text{Nitrogen } BET \text{ surface area in } m^2/g}$$

of between 16 and 50 Angstroms, and
   (v) wherein the carbon supported catalyst is prepared by conventional impregnation methods using aqueous solutions of salts of the elements, and wherein the carbon support is preformed.

2. A catalyst as claimed in claim 1 wherein said catalyst contains 8–35 w % of at least one of tungsten or molybdenum.

3. A catalyst as claimed in claim 1 wherein said catalyst contains 3–12 w % of at least one of nickel or cobalt.

4. A catalyst as claimed in claim 1 wherein said catalyst contains 1–10 w % of chromium.

* * * * *